United States Patent
Yuan et al.

(10) Patent No.: US 7,483,430 B1
(45) Date of Patent: Jan. 27, 2009

(54) HIERARCHICAL HASH METHOD FOR PERFORMING FORWARD ROUTE LOOKUP

(75) Inventors: Felix Yuan, Fremont, CA (US); Jian Li, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 957 days.

(21) Appl. No.: 10/377,841

(22) Filed: Feb. 28, 2003

(51) Int. Cl.
*H04L 12/28* (2006.01)

(52) U.S. Cl. .................... 370/395.2; 370/255; 711/213; 711/216

(58) Field of Classification Search ................ 370/351, 370/395.31, 395.32, 389, 392, 395.7, 397, 370/399, 409, 475, 254, 255, 256; 711/216, 711/217, 200, 213, 211; 709/242
See application file for complete search history.

(56) References Cited

U.S. PATENT DOCUMENTS

| | | | | |
|---|---|---|---|---|
| 6,147,976 A | * | 11/2000 | Shand et al. ................. 370/254 |
| 6,658,482 B1 | * | 12/2003 | Chen et al. ................... 709/245 |
| 6,792,423 B1 | * | 9/2004 | Jeffries et al. .................. 707/6 |
| 6,883,068 B2 | * | 4/2005 | Tsirigotis et al. ............ 711/133 |
| 7,031,320 B2 | * | 4/2006 | Choe ..................... 370/395.31 |
| 7,039,018 B2 | * | 5/2006 | Singh et al. ................. 370/255 |
| 7,096,277 B2 | * | 8/2006 | Hooper ....................... 709/238 |
| 2004/0044868 A1 | * | 3/2004 | Guerrero .................... 711/164 |

OTHER PUBLICATIONS

Marcel Waldvogel, George Varghese, Bernhard Platner, "Scalable high-Speed Prefix Matching", ACM Transactions on Computer Systems, vol. 19, No. 4, Nov. 2001, pp. 4440-482).*
Hinden, Robert M. "IP Next Generation Overview", http://playground.sun.com/pub/ipng/html/INET-IPng-Paper.ltml, pp. 1-20, May 14, 1995.

* cited by examiner

*Primary Examiner*—Aung S Moe
*Assistant Examiner*—Habte Mered
(74) *Attorney, Agent, or Firm*—Cindy Kaplan

(57) ABSTRACT

A method for performing a lookup to support forwarding of IP packets in a router comprising a network processor and a route processor is disclosed. The method includes receiving a packet having an IP address containing a network prefix and dividing available network prefixes into groups. The longest prefix is identified and a lookup is performed using hash tables. The packet is forwarded if a match is found.

19 Claims, 5 Drawing Sheets

HIERARCHICAL HASH METHOD FOR PERFORMING FORWARD ROUTE LOOKUP

BACKGROUND OF THE INVENTION

The present invention relates generally to computer networks, and more particularly, to processing packets within a network.

A network is typically a data communication system which links two or more computers and peripheral devices to allow a user on a computer to access resources and exchange messages with users on other computers. Internetworking is the process of establishing and maintaining communications between and transferring data among multiple local networks in a distributed network system. The network allows users to share resources on their own systems with other network users and to access information on centrally located systems or on systems which are located at remote offices.

A network system typically includes a plurality of routing domains which are each collections of networks under a common administration which share a common routing strategy. Each routing domain includes one or more local networks which are attached to one or more routers. The local network in a routing domain may be a local area network (LAN), metropolitan area network (MAN), or wide area network (WAN), for example. The system includes source and destination nodes (end systems) which are typically computers (e.g., workstations and servers) but may be any type of device which includes a network interface card (NIC).

The routers within the routing domain manage communications among local networks within their domain and communicate with each other using an intradomain routing protocol. The routers transfer information to and from the end systems and among themselves along communication links in formatted packets. When an originating end system wants to transmit information to a destination end system, it generates a packet header in an appropriate format which includes the address of the destination end system, and then fills the remainder of the packet with the information to be transmitted. When a router receives a data packet, it reads the packet's destination address from the packet header and then transmits the packet on the link leading most directly to the packet's destination. Along the path from source to destination, the packet may be transmitted over several links and pass through several routers.

Internet Protocol (IP) is a standard that defines the manner in which the network layers of two hosts interact. These hosts may be on the same network or reside on physically distinct heterogeneous networks. IPv6 (Internet Protocol version 6) is the latest version of the protocol. IPv6 is the "next generation" protocol designed by the IETF to replace the current version Internet Protocol, IP Version 4 ("IPv4"). Most of today's Internet uses IPv4, which is now nearly twenty years old. IPv4 has been resilient in spite of its age, but it is beginning to have problems. Most importantly, there is a growing shortage of IPv4 addresses, which are needed by all new machines added to the Internet. Global Internet routing based on the 32-bit addresses of IPv4 is becoming increasingly strained. IPv4 addresses also do not provide enough flexibility to construct efficient hierarchies which can be aggregated. The new IP was created to deal with the large growth of the Internet. IPv6 fixes a number of problems in IPv4, such as the limited number of available IPv4 addresses. It also adds many improvements to IPv4 in areas such as routing and network auto configuration. IPv6 is expected to gradually replace IPv4, with the two coexisting for a number of years during a transition period. In order for routers to support IPv6, the problem of efficient forwarding of IPv6 packets needs to be addressed along with efficient updates of routing data structure used for forwarding packets.

Various methods have been proposed to implement IPv6 forwarding. A simple approach is to cache adjacency information for an earlier IPv6 destination. The performance improvement expected from this approach is small since each prefix may cover many destinations. Another option is netflow based acceleration. A drawback to this approach is that performance gain is limited, especially when average packets per flow is small. Also, it is not very scaleable since more flow entries will be needed for the same destination address. The current state of art for IPv4 lookup uses mtrie. Different variations of the mtrie-based approaches have been proposed for generic lookups. When applied to IPv6, these approaches either require memory larger than usually available or require many memory accesses which makes high performance implementation difficult to achieve.

SUMMARY OF THE INVENTION

A method and system for performing a lookup to support forwarding of IP packets in a router is disclosed. The method generally comprises receiving a packet having an IP address and dividing known IP prefixes into groups. The longest prefix that matches the IP addresses carried in received packet is identified and a lookup is performed in a hash table. The packet is forwarded if a match is found.

A system for performing a lookup to support forwarding of IP packets generally comprises a route processor and a network processor. The network processor is operable to receive a packet having an IP, search for the longest matching prefix by going though prefix groups in the order of decreasing prefix length, identify matching prefixes in each prefix group using hash tables, and forward the packet if a match is found. The system further includes memory configured to store hash tables. The route processor is operable to receive advertisement of IP prefixes available on the network, put these prefixes in proper prefix groups, and build hash tables for the network processor to lookup the longest matching prefix for each received data packet containing an IP address.

In another aspect of the invention, a computer program product for performing a lookup to support forwarding of IP packets in a router generally comprises code that receives a packet having an IP; code that divides prefixes known to the network into groups (ranges); code that identifies the longest prefix; code that performs a lookup for longest matching prefix using hash tables; code that forwards the packet if a match is found; and a computer-readable storage medium for storing the codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements or nodes. Some of the nodes of the network may be specially configured routers such as those available from Cisco Systems, Inc. of San Jose, Calif. As used herein the term router is used to refer to devices that forward packets based on network and higher layer information. The router may include, for example, one or more processors, interfaces, and a bus (e.g., a PCI bus). When acting under the control of appropriate software or firmware, the processors are responsible for such router tasks as routing table computations, network management, and general processing of packets. They preferably accomplish all of these functions under the control of software including an operating system (e.g., a version of the Internetwork Operating System (IOS®) of Cisco Systems, Inc.) and any appropriate applications software. The processors each include memory which may be non-volatile RAM and/or ROM. However, there are many different ways in which memory could be coupled to the system. In an alternative embodiment, a router or switch may be implemented on a general purpose network host machine such as the computer 20 system of FIG. 5.

Figure 1:
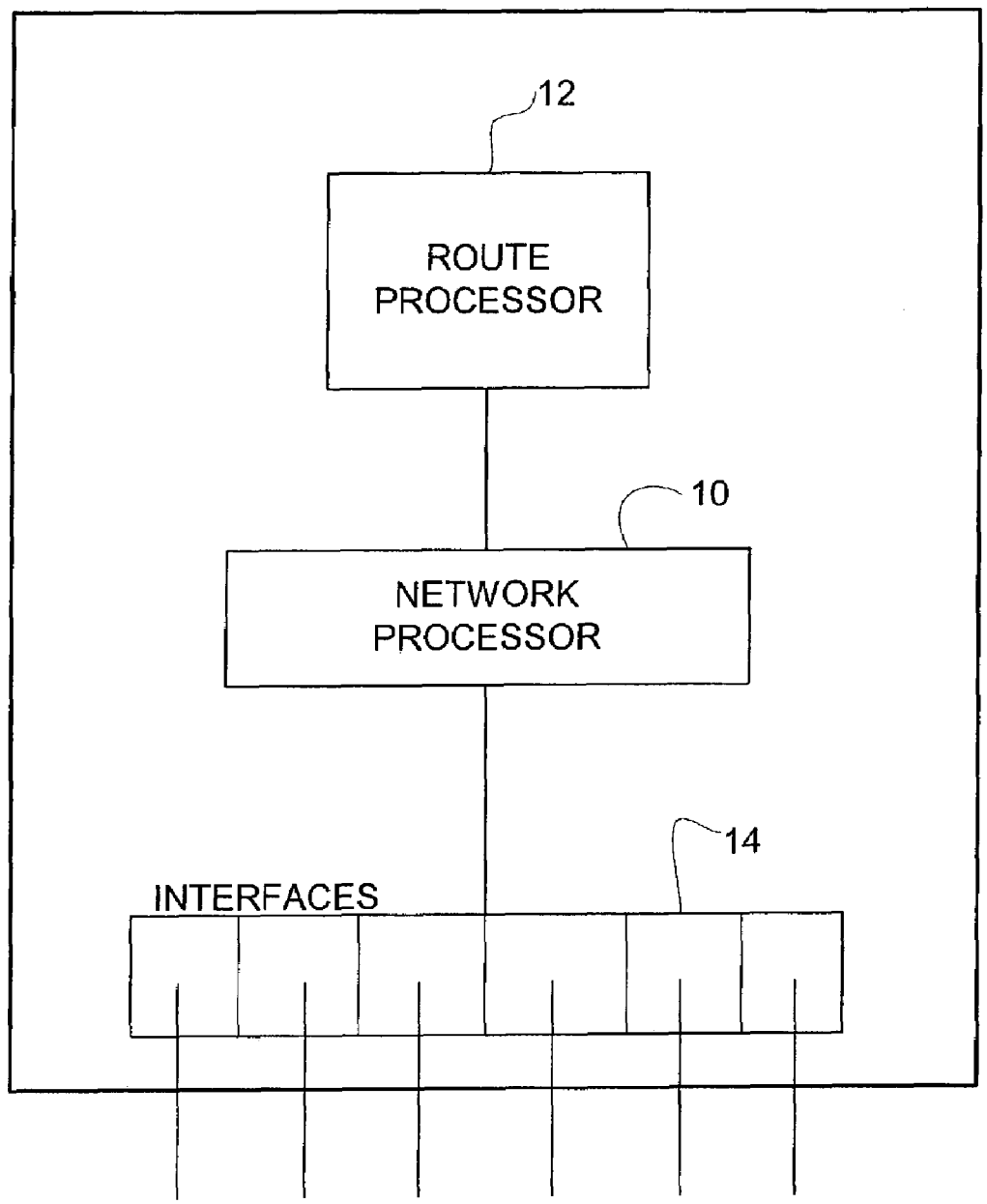
FIG. 1 is a block diagram of an exemplary router which may be used to implement the present invention.

Referring now to the drawings, and first to FIG. 1, the router preferably has a two-tier architecture with a network processor (NPU) 10 and a general purpose processor (route processor) 12. The NPU operates as a forwarding engine. The route processor handles control plane traffic and complex data plane cases that are difficult for the NPU to handle. The NPU 10 is connected to the route processor 12 which is connected to network interfaces 14.

Figure 2:
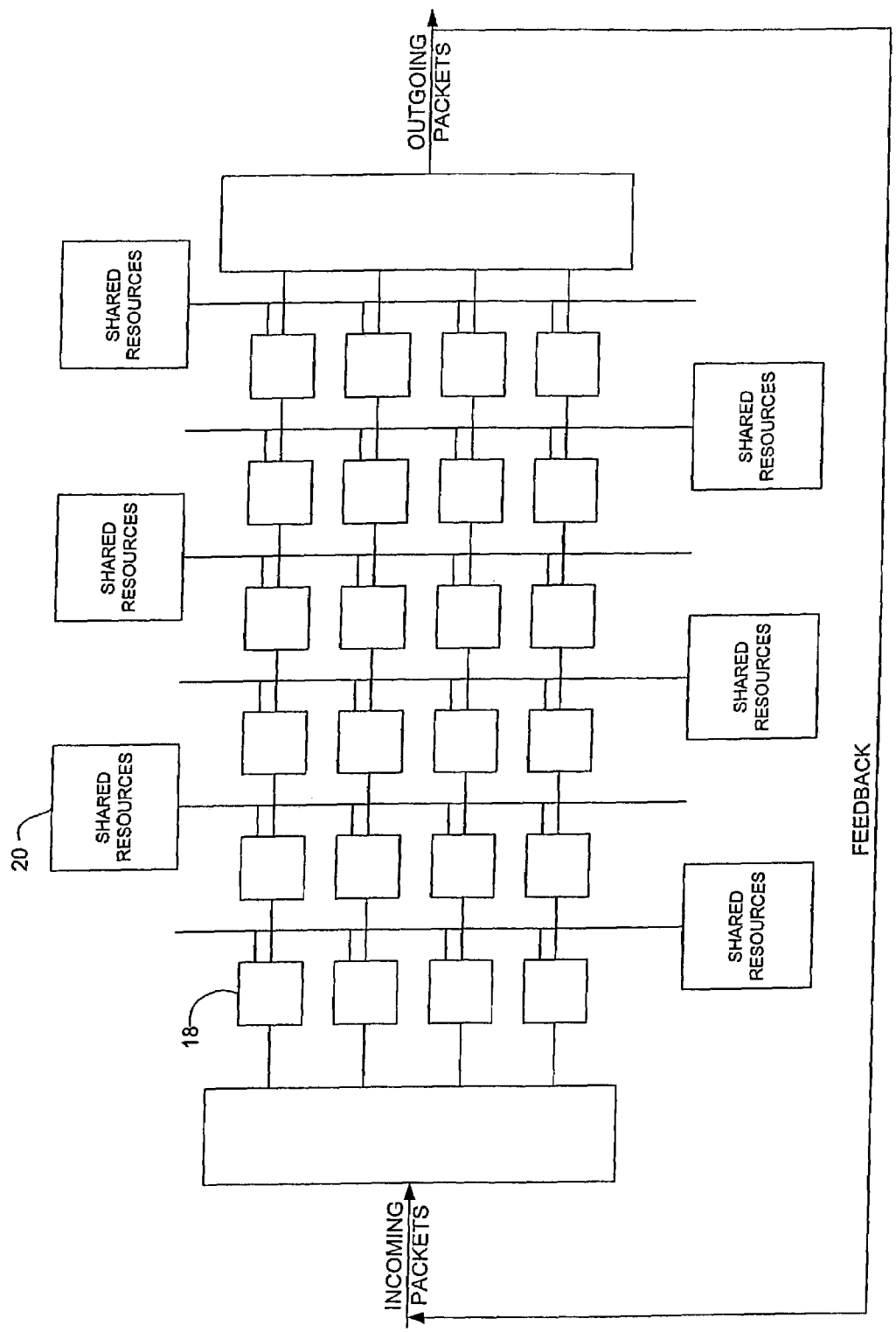
FIG. 2 is a diagram illustrating details of an exemplary network processor of the router of FIG. 1.

FIG. 2 illustrates details of the network processor 10. In one embodiment, the network processor 10 has an architecture of parallel pipelines. The network processor 10 includes a plurality of microprocessors 18 arranged to process data packets in parallel assembly lines. Each microprocessor takes a data packet from the processors before it in the assembly line, performs certain IP services, and passes the partially processed data packet to the next processor in the same assembly line. These microprocessors which are across different assembly line but do similar IP processing on data packets are connected to shared hardware resources 20, such as memory and software resources such as shared hash lookup tables.

The router is used to perform a hierarchical hash method for IPv6 prefix lookup on NPU-based platforms. IPv6 increases the IP address size from 32 bits to 128 bits, to support more levels of addressing hierarchy and a greater number of addressable nodes. IPv6 addresses have a fixed boundary between the network part and the host part of the address. The first 64 bits encode the network prefix, while the last 64 bits encode the host part. Two classes of routes need to be processed: host routes (for which an exact match using a hash table is performed); and prefix routes.

Figure 3:
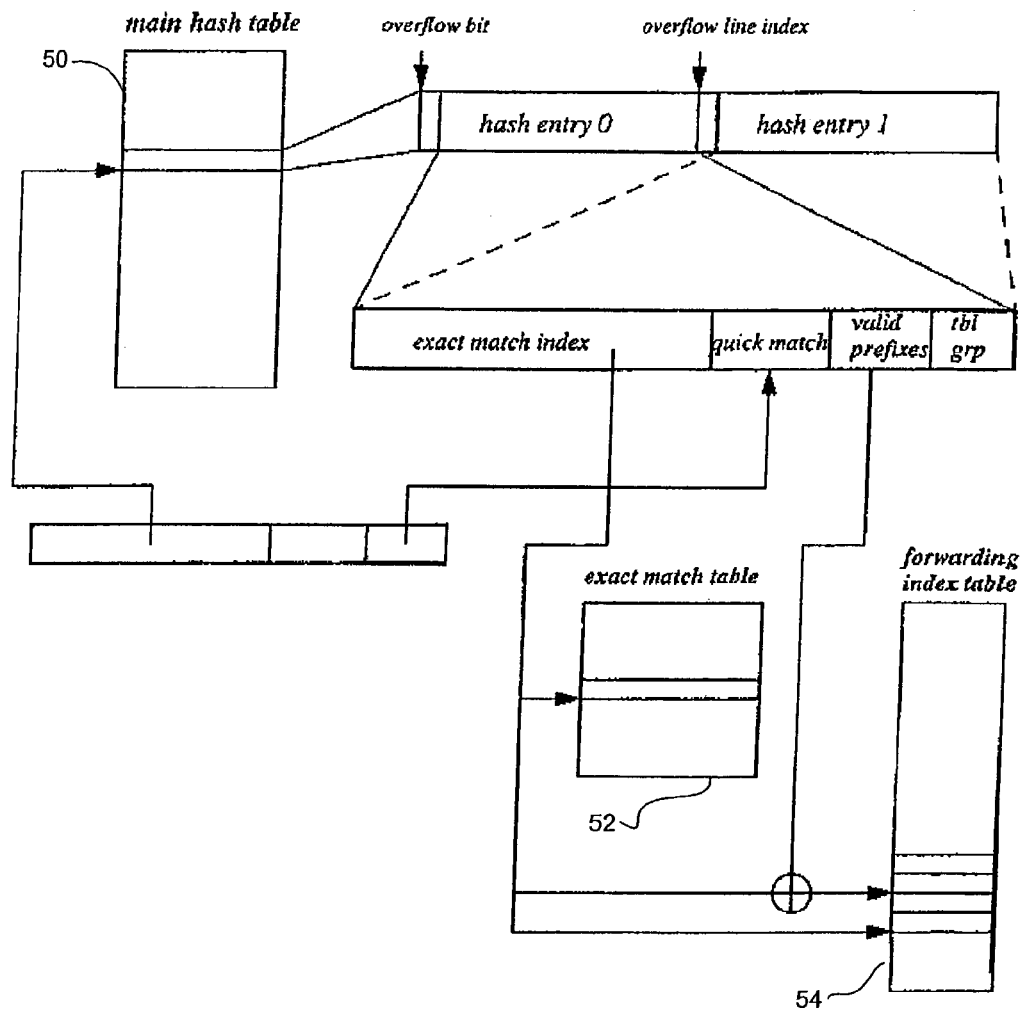
FIG. 3 is a diagram illustrating data structures for tables used by the network processor of FIG. 2 to perform address lookup for forwarding.

FIG. 3 illustrates data structures for tables used in the lookup process described below. The system includes a main hash table 50, exact match table 52, and forwarding index table 54. The hash table 50 has a 512K hash line while each hashline has two hash entries. An overflow bit is used to indicate when more than one prefixes hashes into the same hash line. Overflow buffers are shared among hash lines. It is to be understood that the data structures shown in FIG. 3 is only one example and that other data structures may be used without departing from the scope of the invention.

In order to reduce the hash collision in base level hashing, a hash scheme is used to control hash probability. Two lines of overflow buffers are shared among a group of main hash lines. An overflow line index bit is included to indicate which one of the two overflow lines are used. Overflow buffers located in faster memory (as compared to main hash table) are preferably used. A handful of overflow buffers are available for thousands of main hash lines. This further reduces collision probability. In order to reduce memory usage resulting from base level hashing, some hash tables for prefixes of different lengths are shared. Several bits in the main hash entry structure are designed to distinguish prefixes of different lengths that may be stored in the same hash table.

Figure 4:
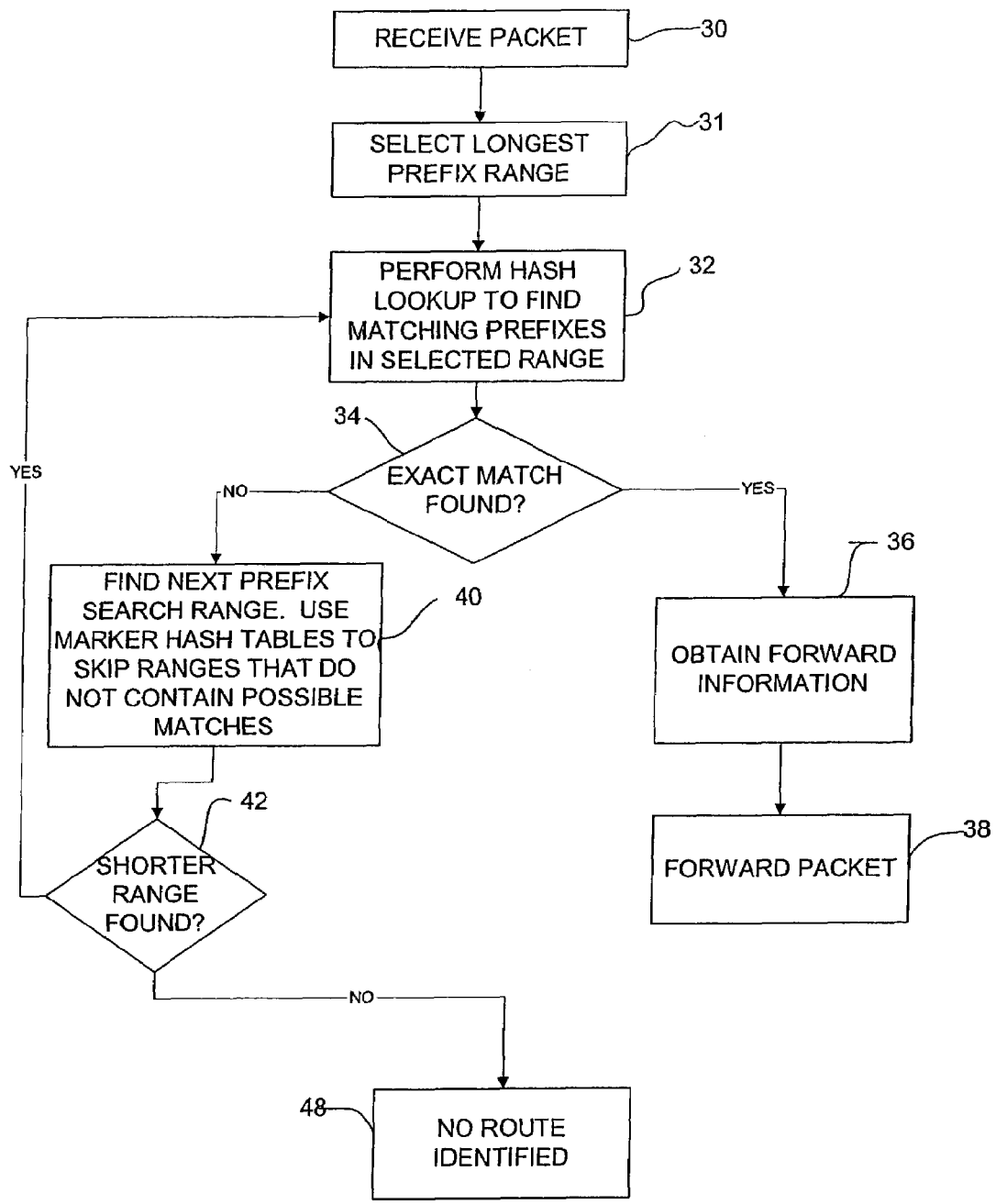
FIG. 4 is a flowchart illustrating a process of the present invention for performing address lookup.

The following describes a two-level hashing scheme which improves performance and simplifies implementation for IPv6 forwarding. FIG. 4 illustrates an overview of the process. At step 30 an IPv6 packet is received. The longest prefix range is selected (step 31). In selected ranges, hash lookup is performed to find matching prefixes (step 32). If an exact match is found (step 34), forward information is obtained and the packet is forwarded (steps 36 and 38). If an exact match is not found, the next prefix search range is identified (step 40). Marker hash tables are used to skip ranges that do not contain possible matches. If a shorter range is found, hash lookup is performed and the process is repeated (steps 42 and 32). If all prefix ranges have been searched through and no matching prefix is identified, the program exists indicating no route was found (steps 42 and 48).

When a match is found, the packet is ready for adjacency processing. When no match is found, an ICMP message may be generated and the packet passed to the route processor for further processing. There may also be a case wherein the processor is not able to determine whether or not there is a match. This may occur, for example, when there is a hash collision that cannot be resolved. The packet is then passed to the route processor for processing.

The following provides additional details for the lookup and optimization processes (steps 32 and 40) discussed above with respect to the flowchart of FIG. 4. When the lookup process is started, base level hasing is first performed. This process sweeps through the prefix range from the longest possible value to the shortest possible value and returns with corresponding adjacency index when an exact match is found. The prefix range is divided into subranges, with each subrange being handled in a similar manner. A set of quick hash tables which contain prefixes from several subranges is provided. Checking into the quick hash table may provide information that several subranges need not to be looked into, thus improving the average performance of the system.

In one embodiment, the prefix is divided into subranges of 4 bits each, as follows:

(4N−3), (4N−2), (4N−1), (4N)

The longest prefix match is searched by going through the groups in decreasing order of prefix length. To find a match in each 4-bit group, hash techniques are used to perform the IPv6 address lookup. It is to be understood that the prefix may be divided into subranges other than 4 bits, without departing from the scope of the invention.

In order to reduce the number of prefix lookups, the odd length of prefixes are converted to even length prefixes. An additional two bits from hash matched prefixes are stored in hash entry. The exact match prefix has higher priority than the converted match prefixes in the hash entry. Hence, the exact match prefix will replace the converted match prefix if there is one in a hash entry. The 4N−2, (4N−1), and (4N) can share one entry if these (4N−2) bits are the same.

With the odd prefix conversion and entry sharing among prefixes across 4-bit length range, only 32 lookups are needed. Prefix length is at least and lookup of prefixes with length of 4-8 bits can be performed using a direct lookup table. This leaves only thirty 4-bit groups to be addressed using more complex schemes. The 4-bit groups are divided as shown in Table I below. The number in parenthesis indicates the number of groups in each range.

TABLE I

|        | COLUMN X   | COLUMN Y  | COLUMN Z  |
|--------|------------|-----------|-----------|
| PASS 1 | 128-121 (2)| 120-105 (4)| 104-89 (4)|
| PASS 2 | 88-73 (4)  | 72-57 (4) | 56-41 (4) |
| PASS 3 | 40-25 (4)  | 24-9 (4)  |           |

One Pass: longest prefixes length 128-89
Two Passes: longest prefixes length 88-41
Three Passes: longest prefixes length 40-9

Since the process starts with the longest possible prefixes and moves to the shorter ones if no match is found, the first one found is the longest match. Therefore, once a match is found, there is no need to go through the rest of the prefix hash table.

Depending on the resources available, more or fewer columns may be used to process prefix hash tables of different lengths. The tradeoff is between resource usage and forwarding throughout. More columns involved in forwarding require more memory, but provide better performance.

The following describes possible optimizations for the above process. The first is interleaving memory accesses. In order to minimize the chance of memory access conflicts, the hash tables (based on the hash index) may be divided between two memory controllers and different banks. Subsequent hash accesses are interleaved between memory controllers. In one example, the hash table for prefixes of length (8N−3, 8N−2, 8N−1, 8N) is located in one controller and the hash table for prefixes of lengths (8N−7, 8N−6, 8N−5, 8N−4) is located in a different controller.

In another optimization process, an additional level of hash lookup is provided to reduce the number of sweeping ranges. The prefix ranges may be labeled as shown in Table II:

TABLE II

|        | COLUMN X    | COLUMN Y   | COLUMN Z  |
|--------|-------------|------------|-----------|
| PASS 1 | a. 128-121  | b. 120-105 | c. 104-89 |
| PASS 2 | d. 88-73    | e. 72-57   | f. 56-41  |
| PASS 3 | g. 40-25    | h. 24-9    |           |

Using a pre-checking before sweeping through the next group of subranges in the next column may save a pass. For example, if after going through range a) and before starting with b), it may be possible to decide that there is no valid prefix in ranges b), c), or d) that will match the incoming destination address. Then, in column Y, instead of searching through range b), sweeping can start at range be) and a pass is saved.

The following illustrates four places where this optimization may be made:

1. a)−>e) instead of b), jump over 73-120
2. b)−>f) instead of c), jump over 57-104
3. c)−>g) instead of d), jump over 41-88
4. d)−>h) instead of e), jump over 25-72

An additional marker table is used in each column. After the normal hash lookup, if nothing is found, the marker table may be looked in for the destination. The marker table contains an entry for an IP destination, if any following columns may contain an entry for this IP address. If so, the normal processing is continued, otherwise, the three ranges are jumped over.

In a third optimization process, it is assumed that for most cases, there is either a 128-bit address for hosts and 64-bit or shorter address for networks. Then there are about half as many prefix ranges to be handled. If the three columns used in the basic scheme are retained, the range allocation of Table III results:

TABLE III

|        | COLUMN X             | COLUMN Y    | COLUMN Z   |
|--------|----------------------|-------------|------------|
| PASS 1 | a. 128<br>b. 64-61 (1)| c. 60-45 (4)| d. 44-37 (2)|
| PASS 2 | e. 36-2 1 (4)        | f. 20-9 (3)<br>g. 8-4 |            |

A marker node may be installed in Column X, which contains an entry for each prefix of length 60-21. Before going through hash tables for length 60-45 the marker table is consulted to determine if a short cut can be made to save a pass. Before going through hash tables for lengths 44-4, another marker in Column Y may be consulted in order to decide if it is possible to punt without going to the next path.

Another option is to use only two columns for IPv6 forwarding. This will save memory requirements if resources are limited.

TABLE IV

|        | COLUMN X | COLUMN Y | COLUMN Z |
|--------|----------|----------|----------|
| PASS 1 | a. 128   | b. 64-49 |          |
| PASS 2 | c. 48-33 | d. 32-17 |          |
| PASS 3 | e. 16-4  | f.       |          |

These marker tables may be installed for the above scheme (Table IV) to find short cuts: 1) a-d, 2) b-e, 3) c-f.

In another optimization method, the hash seed may be selected to minimize hash collision and the number of hash tables. This method may be extended into selecting a hash function from a predefined set of hash functions to reduce hash collision.

Figure 5:
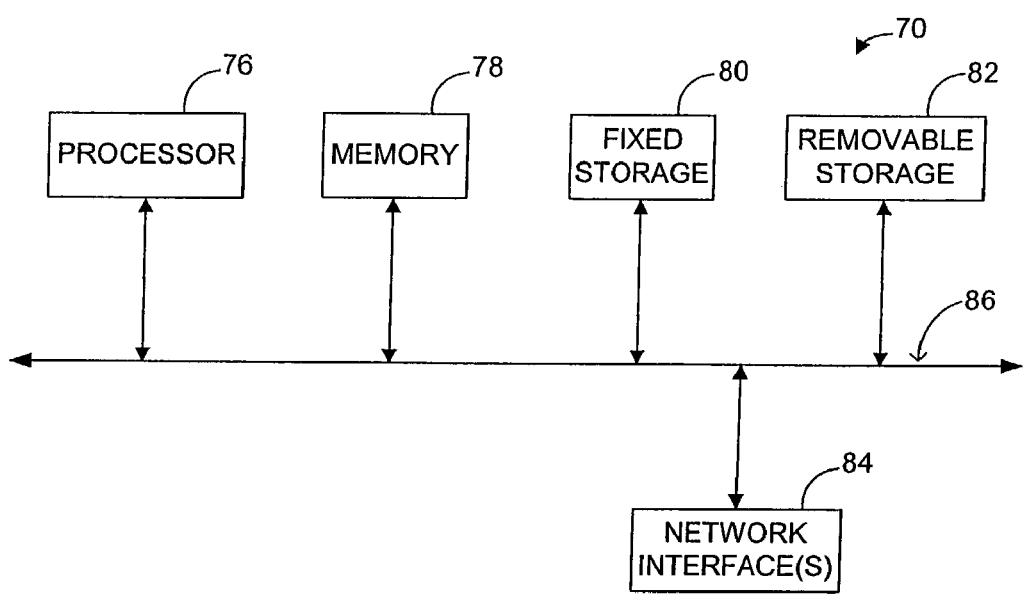
FIG. 5 is a system block diagram of a computer system that can be utilized to execute software of an embodiment of the present invention.

FIG. 5 shows a system block diagram of computer system 70 that may be used as a router or host or used to execute software of an embodiment of the invention. The computer system 70 includes memory 78 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 70 further includes subsystems such as a central processor 76, fixed storage 80 (e.g., hard drive), removable storage 82 (e.g., CD-ROM drive), and one or more network interfaces 84. Other computer systems suitable for use with the invention may include additional or fewer subsystems. For example, computer system 70 may include more than one processor 76 (i.e., a multi-processor system) or a cache memory. The computer system 70 may also include a display, keyboard, and mouse (not shown) for use as a host.

The system bus architecture of computer system 70 is represented by arrows 86 in FIG. 5. However, these arrows are only illustrative of one possible interconnection scheme serving to link the subsystems. For example, a local bus may be utilized to connect the central processor 76 to the system memory 78. Computer system 70 shown in FIG. 5 is only one example of a computer system suitable for use with the invention. Other computer architectures having different configurations of subsystems may also be utilized. Communication between computers within the network is made possible with the use of communication protocols, which govern how computers exchange information over a network.

The invention described herein may also be implemented in dedicated hardware, microcode, or photonic (optical) logic.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for performing a lookup to support forwarding of IP packets in a router comprising a network processor and a route processor, the method comprising:

receiving a packet containing a destination IP address at a device comprising a base hash table containing IP prefixes divided into prefix groups according to prefix length and quick hash tables each comprising the IP prefixes from two or more of said prefix groups and configured to identify one or more of said prefix groups to search in the base hash table;

performing a lookup for the IP address in the base hash table, said lookup comprising searching the prefix group containing the longest prefix, wherein performing said lookup comprises searching a first prefix group in the base hash table and if a match is not found in said first prefix group, searching one of the quick hash tables for the IP address to determine the next prefix group to search in the base hash table by identifying one or more prefix groups that do not need to be searched in the base hash table;

performing adjacency processing at the network processor if a match is found in one of the prefix groups; and forwarding the packet from the network processor performing said lookup to a route processor for further processing if no match is found;

wherein the network processor comprises a plurality of microprocessors arranged to process data packets in parallel pipelines, and performing a lookup for the IP address comprises processing a data packet at one or more of said parallel pipelines and wherein the hash tables are located on two or more memory controllers and subsequent hash accesses are interleaved between memory controllers.

2. The method of claim 1 wherein an ICMP message is generated if no match is found.

3. The method of claim 1 further comprising converting odd length prefixes into even length prefixes.

4. The method of claim 1 wherein the prefix groups comprise only a 128-bit address group and 64-but and shorter address groups.

5. The method of claim 1 further comprising providing different hash seeds in hash computation.

6. The method of claim 5 further comprising selecting a hash seed from a plurality of hash seeds to minimize hash collision.

7. The method of claim 5 further comprising selecting a hash function from a plurality of hash functions to minimize hash collisions.

8. A system for performing a lookup to support forwarding of IP packets, the system comprising:

a route processor;

memory for storing a base hash table comprising IP prefixes divided into prefix groups according to prefix length and quick hash tables each comprising the IP prefixes from two or more of said prefix groups and configured to identify one or more of said prefix groups to search in the base hash table; and a network processor operable to receive a packet containing a destination IP address, perform a lookup for the longest matching prefix in the base hash table by searching the prefix group containing the longest prefix, and forward the packet if a match is found in one of the prefix groups; and wherein said lookup comprises searching a first prefix group in the base hash table and if a match is not found in said first prefix group, searching one of the quick hash tables to determine the next prefix group to search in the base hash table by identifying one or more prefix groups that do not need to be searched in the base hash table; and wherein the network processor comprises a plurality of microprocessors arranged to process data packets in parallel pipelines, and said lookup for the IP address comprises processing a data packet at one or more of said parallel pipelines and wherein the hash tables are located on two or more memory controllers and subsequent hash accesses are interleaved between memory controllers.

9. The system of claim 8 wherein the memory comprises two hash tables, each table located on a separate memory controller.

10. The system of claim 8 wherein the packet received has a 128 bit address.

11. An apparatus comprising:

a network processor configured for receiving a packet containing a destination IP address;

a base hash table containing IP prefixes divided into prefix groups according to prefix length and quick hash tables each comprising the IP prefixes from two or more of said prefix groups and configured to identify one or more of said prefix groups to search in the base hash table;

a computer-readable medium comprising instructions which, when executed by the network processor, cause the network processor to perform a lookup for a matching prefix in the base hash table, said lookup comprising searching the prefix group containing the longest prefix;

wherein said lookup comprises searching a first prefix group in the base hash table and if a match is not found in said first prefix group, searching one of the quick hash tables for the IP address to determine the next prefix group to search in the base hash table by identifying one or more prefix groups that do not need to be searched in the base hash table; and forwarding the packet if a match is found in one of the prefix groups; and a route processor configured to forward the packet if a match is not found by the network processor;

wherein the network processor comprises a plurality of microprocessors arranged to process data packets in parallel pipelines, and said lookup for the IP address comprises processing a data packet at one or more of said parallel pipelines and wherein the hash tables are located on two or more memory controllers and subsequent hash accesses are interleaved between memory controllers.

12. The system of claim 8 further comprising overflow buffers corresponding to hash lines in the base hash table and located in faster memory than the base hash table.

13. The system of claim 8 wherein the packet is an IPv6 packet.

14. The system of claim 8 wherein each of said prefix groups comprises a range of 4 bits.

15. The method of claim 1 wherein the base hash table and the quick hash tables are arranged in a two-level hierarchy.

16. The method of claim 1 wherein the base hash table comprises prefixes hashed into one of said prefix groups.

17. The method of claim 1 wherein said first prefix group comprises longer prefixes than said next prefix group.

18. The system of claim 8 wherein the microprocessors located in different parallel pipelines share memory resources.

19. The apparatus of claim 11 wherein the prefix groups are four-bit groups.

* * * * *